2,889,348

FLUOSILANE MANUFACTURE

Frederick T. Fitch, Baltimore, Md., assignor to W. R. Grace & Co., New York, N.Y., a corporation of Connecticut No Drawing. Application June 29, 1955
Serial No. 519,001

4 Claims. (Cl. 260—448.2)

This invention relates to the production of fluorinated silanes. More particularly, it relates to a method of producing fluosilanes of the general formula $$R_a SiCl_b F_{(4-a-b)}$$

where R is an alkyl or aryl radical, $a$ is equal to 1–3, $b$ is equal to 0–2, and the sum of $a$ and $b$ is equal to 1, 2 or 3.

It is well known that alkyl and aryl silanes can be prepared by passing an alkyl or aryl chloride vapor over heated silicon powder, which generally will contain a small proportion of another metal to promote the reaction. Through a complex series of concurrent reactions, the organic and chloride radicals unite with the silicon to produce a mixture of substituted chlorosilanes as volatile end products. The present invention provides an equally efficient and convenient method of preparing silanes containing fluorine substituted for chlorine.

I have discovered that alkyl and aryl substituted fluosilanes, with or without chlorine substituents, can be prepared by contacting an alkyl or aryl chloride vapor with finely divided silicon in the presence of silicon tetrafluoride at temperatures between about 250° C. and about 500° C. The resulting gaseous reaction products are condensed in a low temperature zone or trap and separated from one another by efficient low temperature fractionation. The fluosilane products of the present invention are a series of compounds of the general formula $R_a SiCl_b F_{(4-a-b)}$, where R is an alkyl or aryl radical, $a$ is equal to 1–3, $b$ is equal to 0–2, and the sum of $a$ and $b$ is equal to 1, 2 or 3. More particularly, the following fluorinated silanes are formed: $RSiR_3$, $RSiClF_2$, $RSiCl_2F$, $R_2SiF_2$, $R_2SiClF$, and $R_3SiF$. These compounds are of considerable value in the preparation of polymeric siloxane or silicone materials.

The present invention contemplates the use of a finely divided silicon metal-containing mass, such as ferrosilicon, an alloy of silicon with copper, or silicon promoted with nickel, cobalt, antimony, phosphorus, or other promoter metal alone or in combination, however, copper is usually preferred. The art is replete with references to improved silicon masses which may be used in the preparation of silanes, and such masses are within the contemplation of the present invention. In any event, these silicon metal-containing materials are finely divided and made up of particles of fairly uniform size, usually through 8 and on 40 or on 60 mesh screen.

In accordance with the present invention, the silicon metal-containing mass is preliminarily heated to a temperature above about 250° C., after which alkyl or aryl chloride and silicon tetrafluoride gases are contacted therewith. The desired elevated temperature, between 250° and 500° C., is maintained during contact, and the reaction chamber is maintained free of oxidizing gases and moisture. In the case of the lower alkyl chlorides, i. e., those containing less than 6 carbon atoms, the process is generally carried out at temperatures between about 300° and 400° C. Below 250° C., there is substantially no formation of fluorinated silanes. The silicon tetrafluoride and alkyl chloride or aryl chloride vapors are simultaneously contacted with the finely divided silicon. The gases may be introduced into the reactor containing silicon from separate streams, however, they are preferably pre-mixed and introduced in a single stream. Occasionally it may prove desirable to dilute the gas stream with an inert carrier gas, such as oxygen-free nitrogen to facilitate flow of the gaseous products from the reactor to the condensing trap. Alternatively, gas flow to the trap may be speeded up by injecting an inert gas between the product end of the reactor and the condensing trap. Such an inert gas must remain volatile at the low temperatures employed to condense the reaction products.

It is important to the method of the present invention that the relative concentrations of alkyl or aryl chloride and silicon tetrafluoride reactants in the reaction zone be controlled within certain limits, namely, at a mole ratio between about 0.5:1 to 3:1 hydrocarbon halide to silicon tetrafluoride. For example, within the specified range a low mole ratio reduces both yield and quantity of fluosilane products at intermediate temperatures, i. e., about 365°–375° C. However, satisfactory yields of the substituted fluosilanes are obtained when the mole ratio of hydrocarbon halide to silicon tetrafluoride is within the specified range. As indicated above, the fluosilane products of the general formula $R_a SiCl_b F_{(4-a-b)}$ are separated from the other products of the reaction, namely, the silicon chlorofluorides $SiClF_3$, $SiCl_2F_2$, $SiCl_3F$, and a small quantity of $SiCl_4$, and unreacted starting material by low temperature fractionation.

The method of the present invention is further illustrated by the following non-limiting example.

Example

An intimate mixture of 225 g. of powdered silicon metal and 39 g. of cuprous chloride supported on 25–30 g. ¼"–½" Pyrex glass-wool fibers was packed to a depth of 14" in a 2" diameter Pyrex tube. This tube which served as the reactor was mounted horizontally in an electric tube furnace. The thus packed tube was heated for 2 hours at 400° C. in a slow current of nitrogen. On heating, the cuprous chloride was reduced to copper. The bed was then allowed to cool to about 300° C. and a single stream of pre-mixed methyl chloride and silicon tetrafluoride were introduced to the reaction zone. Upon initiation of the reaction, the mole ratio of methyl chloride to silicon tetrafluoride was about 1:1, and this ratio was reduced to about 0.5:1 during the run. The average flow rates were 107 cc./min. of methyl chloride, and 130 cc./min. of silicon tetrafluoride, both measured at 25° C. At these flow rates, contact time with the silicon bed was approximately 1 minute. Flow rates were maintained for 12 hours during which the temperature was slowly increased to 327° C.

Two Dry Ice-acetone traps collected the product, which consisted of a liquid and appreciable quantities of crystalline material which melted just above Dry Ice-acetone temperature (−78° C.). The products were transferred to a low temperature distillation column for separation. The initial fractions (−32° to −28.5° C.) contained small quantities of crystals in the liquid at Dry Ice-acetone temperatures. The remaining fractions (−25° to −21° C.) were largely unreacted methyl chloride, and the still residue contained 5–10 ml. of higher boiling products (0° C. and up) which showed signs of decomposition on warming. At the start of the distillation, (−32° to −28.5° C.) a large quantity of crystals sublimed on the Dry Ice-acetone cold finger and remained undisturbed throughout the later operations.

The first fraction (−32° to −28.5° C.) was hydrolyzed in dilute ammonia solution and $SiO_2$, F and Cl determined. The results of this determination indicated a mole ratio of Si:Cl:F of 1:0.125:3.10. This product was identified as $CH_3SiF_3$, from its boiling point of $-30.2°$ C. and from the Si:Cl:F mole ratio. The material was contaminated with a trace of silicon chlorofluorides, e.g., $SiCl_2F_2$.

The crystalline sublimate was also hydrolyzed and found to have a mole ratio of Si:Cl:F of 1:0.06:2.96. This material was identified as substantially pure $CH_3SiF_3$.

The still residue was hydrolyzed and found to have a mole ratio of Si:ClF of 1:0.93:1.54, and was identified as a mixture of substituted chlorofluorosilanes of the general formula $(CH_3)_aSiCl_bF_{(4-a-b)}$.

I claim:

1. A method of preparing fluosilanes of the general formula $R_aSiCl_bF_{(4-a-b)}$, where R is an alkyl radical, $a$ is equal to 1–3, $b$ is equal to 0–2, and the sum of $a$ and $b$ is equal to 1–3, which comprises simultaneously contacting a finely divided silicon metal-containing mass with a lower alkyl chloride vapor and silicon tetrafluoride in the mole ratio alkyl chloride to silicon tetrafluoride of about 0.5:1 to 3:1 at about 250°–500° C., condensing the reaction products and separating said fluosilanes therefrom.

2. A method of preparing lower alkyl fluosilanes of the general formula $R_aSiCl_bF_{(4-a-b)}$, where R is an alkyl radical containing less than 6 carbon atoms, $a$ is equal to 1–3, $b$ is equal to 0–2, and the sum of $a$ and $b$ is equal to 1–3, which comprises simultaneously contacting a finely divided silicon metal-containing mass with an alkyl chloride vapor containing less than 6 carbon atoms and silicon tetrafluoride in the mole ratio alkyl chloride to silicon tetrafluoride of about 0.5:1 to 3:1 at about 300°–400° C., condensing the reaction products and separating lower alkyl fluosilanes therefrom.

3. A method of preparing methyl fluosilanes of the general formula $(CH_3)_aSiCl_bF_{(4-a-b)}$, where $a$ is equal to 1–3, $b$ is equal to 0–2, and the sum of $a$ and $b$ is equal to 1–3, which comprises simultaneously contacting a finely divided silicon metal-containing mass with methyl chloride vapor and silicon tetrafluoride at a ratio of about 0.5–3 moles of alkyl chloride per mole of silicon tetrafluoride and at about 250°–500° C., condensing the reaction products and separating said methyl fluosilanes therefrom.

4. A method of preparing methyl trifluosilane which comprises simultaneously contacting a finely divided silicon metal-containing mass with methyl chloride and silicon tetrafluoride at a ratio of about 0.5–3 moles of aklyl chloride per mole of silicon tetrafluoride and at about 250°–500° C., condensing the reaction products and separating methyl trifluosilane therefrom.

References Cited in the file of this patent

UNITED STATES PATENTS

| | | |
|---|---|---|
| 2,380,995 | Rochow | Aug. 7, 1945 |
| 2,478,493 | Levine | Aug. 9, 1949 |
| 2,483,373 | Rochow | Sept. 27, 1949 |
| 2,488,487 | Barry et al. | Nov. 15, 1949 |

OTHER REFERENCES

Newth: "Chemical News," vol. 72 (1895), p. 278.